(12) United States Patent
Merz et al.

(10) Patent No.: US 10,322,961 B2
(45) Date of Patent: Jun. 18, 2019

(54) ELECTROSTATICALLY PINNED GLASS ROLL, METHODS AND APPARATUS FOR MAKING

(71) Applicant: CORNING INCORPORATED, Corning, NY (US)

(72) Inventors: Gary Edward Merz, Rochester, NY (US); John Earl Tosch, Wellsburg, NY (US); Thaddeus Francis Trzeciak, Naples, NY (US)

(73) Assignee: Corning Incorporated, Corning, NY (US)

( * ) Notice: Subject to any disclaimer, the term of this patent is extended or adjusted under 35 U.S.C. 154(b) by 31 days.

(21) Appl. No.: 15/640,783

(22) Filed: Jul. 3, 2017

(65) Prior Publication Data

US 2017/0297942 A1 Oct. 19, 2017

Related U.S. Application Data

(62) Division of application No. 14/353,343, filed as application No. PCT/US2012/061509 on Oct. 24, 2012, now Pat. No. 9,714,184.

(Continued)

(51) Int. Cl.
*C03B 13/04* (2006.01)
*H02N 13/00* (2006.01)
(Continued)

(52) U.S. Cl.
CPC ............... *C03B 13/04* (2013.01); *B32B 7/06* (2013.01); *B32B 17/064* (2013.01); *B32B 17/065* (2013.01); *B32B 17/066* (2013.01); *B65H 16/00* (2013.01); *B65H 18/00* (2013.01); *B65H 18/28* (2013.01); *H02N 13/00* (2013.01);
(Continued)

(58) Field of Classification Search
USPC ................................. 156/184, 191, 192, 247
See application file for complete search history.

(56) References Cited

U.S. PATENT DOCUMENTS

| 2,476,145 A | 7/1949 | Gwyn et al. |
| 3,134,704 A | 5/1964 | Modigliani |
| (Continued) | | |

FOREIGN PATENT DOCUMENTS

| DE | 10323301 A1 | 4/2004 |
| EP | 0280485 A1 | 8/1988 |
| (Continued) | | |

OTHER PUBLICATIONS

TW101139312 Search Report dated Oct. 4, 2016, Taiwan Patent Office, 1 pg.

(Continued)

*Primary Examiner* — Sing P Chan
(74) *Attorney, Agent, or Firm* — Jeffrey A. Schmidt

(57) ABSTRACT

A roll (10) of glass ribbon (20) and an interleaf material (40) disposed in alternating layers, wherein a layer of the interleaf material is pinned to an adjacent layer of the glass ribbon by an electrostatic force that is of a value so that a shear force required to cause slip between the interleaf material and the glass ribbon is greater than or equal to 10 times that required to cause slip between them when not electrostatically pinned together. Methods for winding and unwinding the roll, as well as an apparatus for winding the glass ribbon and interleaf material into a roll, are also disclosed.

11 Claims, 4 Drawing Sheets

Related U.S. Application Data

(60) Provisional application No. 61/553,360, filed on Oct. 31, 2011.

(51) Int. Cl.
  *B65H 16/00* (2006.01)
  *B65H 18/00* (2006.01)
  *B65H 18/28* (2006.01)
  *B32B 17/06* (2006.01)
  *B32B 7/06* (2019.01)

(52) U.S. Cl.
  CPC ............... *B65H 2301/4127* (2013.01); *B65H 2301/5132* (2013.01); *B65H 2801/61* (2013.01)

(56) References Cited

U.S. PATENT DOCUMENTS

| | | |
|---|---|---|
| 3,844,657 A | 10/1974 | Schweriner |
| 3,858,285 A | 1/1975 | Williams |
| 3,885,870 A | 5/1975 | Levy et al. |
| 3,892,614 A | 7/1975 | Levy |
| 3,962,386 A | 6/1976 | Driscoll |
| 4,028,032 A | 6/1977 | Hebert |
| 4,298,653 A | 11/1981 | Maaghul |
| 4,309,368 A | 1/1982 | Groves |
| 4,344,807 A | 8/1982 | Dennesen et al. |
| 4,534,918 A | 8/1985 | Forrest, Jr. |
| 5,118,453 A | 6/1992 | Leyens et al. |
| 5,494,619 A | 2/1996 | Zaretsky et al. |
| 6,735,982 B2 | 5/2004 | Matthies |
| 6,815,070 B1 | 11/2004 | Burkle et al. |
| 7,318,875 B2 | 1/2008 | Kruchko |
| 8,497,006 B2 | 7/2013 | Tomamoto et al. |
| 2011/0223386 A1 | 9/2011 | Tamamoto et al. |
| 2012/0070679 A1 | 3/2012 | Shimizu et al. |
| 2013/0133809 A1 | 5/2013 | Kondo |

FOREIGN PATENT DOCUMENTS

| | | |
|---|---|---|
| GB | 2077235 A | 12/1981 |
| WO | 1987006626 A1 | 11/1987 |
| WO | 2010038757 A1 | 4/2010 |

OTHER PUBLICATIONS

English Translation of KR1020147012800 Notice of Allowance dispatched May 3, 2019; 1 page; Korean Patent Office.

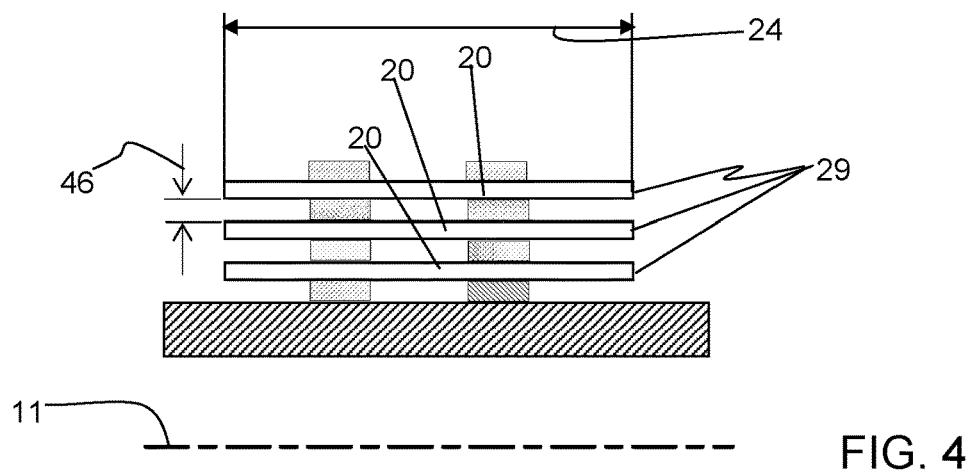
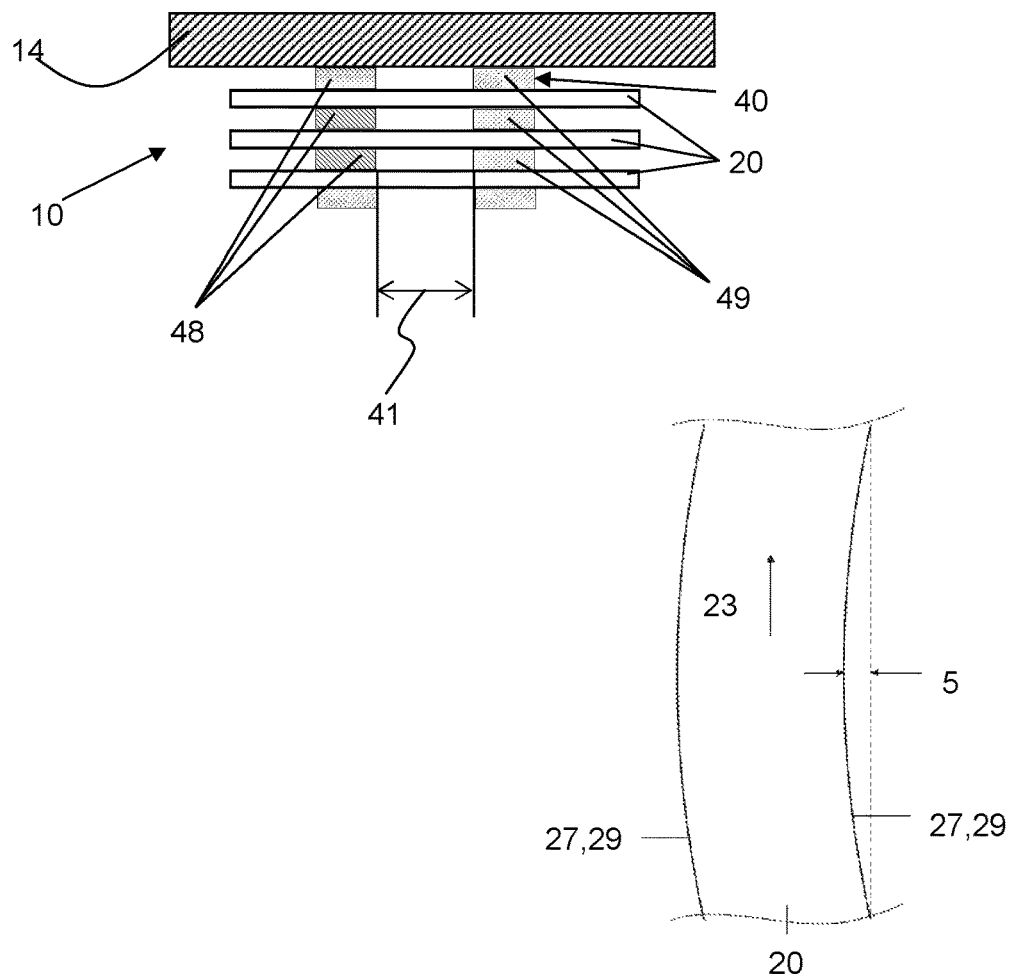
FIG. 4
FIG. 7

… …

ELECTROSTATICALLY PINNED GLASS ROLL, METHODS AND APPARATUS FOR MAKING

This application is a divisional of and claims the benefit of priority under 35 U.S.C. § 120 of U.S. application Ser. No. 14/353,343 filed on Oct. 24, 2012, which in turn, claims the benefit of priority under 35 U.S.C. § 371 of International Patent Application Ser. No. PCT/US12/61509 filed on Oct. 24, 2012, which, in turn, claims the benefit of priority of U.S. Provisional Patent Application Ser. No. 61/553,360 filed on Oct. 31, 2011, the contents of each of which is relied upon and incorporated herein by reference in their entireties.

BACKGROUND

Field

The invention is directed to a roll of glass as well as a method and apparatus for rolling the glass. More particularly, the invention is directed to a roll of glass ribbon wound together with an interleaf material, as well as to an apparatus and method for rolling them together.

Technical Background

Although formed as a continuous ribbon, glass is typically segmented into sheets as soon as it has cooled and solidified. Recent product trends—in ePaper front plane substrates, protective cover sheets in photovoltaic modules, touch sensors, solid state lighting, and electronics, for example—have resulted in requirements for thinner and thinner glass. As glass thicknesses continue to decrease, however, these sheets become more flexible. This creates a challenge from a handling perspective, particularly for glass of 0.3 mm or thinner. Accordingly, there have been attempts to wind thin glass into a roll as a manner of facilitating handling. However, there are several unique features of glass that create challenges for successfully implementing a winding process.

First the edge "beads" of the glass, as formed, are substantially thicker than the constant thickness area in between. Second, glass is extremely sensitive to surface defects. These defects create stress points that generate cracks and lead to breakage. Thus it is not advisable to have direct surface to surface contact of glass to itself, as is typical in a spooled roll of material. The challenges from these first two characteristics have been addressed by using various interleaf materials between layers of the glass ribbon when winding.

Third, as noticed by the inventors of the subject matter in the present disclosure, and which has gone unaddressed—in terms of effect on winding thin glass ribbon, i.e. 0.3 mm or thinner—is that the forming process can introduce differential thickness across the width of the glass ribbon and/or camber (continuous curvature in one direction caused by, for example, differential cooling between the two edge beads). When winding a glass ribbon with differential cross-ribbon thickness and/or camber, lateral forces are generated in the wound roll that result in angled, rather than straight, side walls on the wound roll. In some cases, the angle of the side wall may lead to the glass ribbon contacting a flange of a spool onto which the glass ribbon is being wound, thereby risking damage to the glass ribbon. Additionally, the angled side wall of the roll leads to difficulties in processing, when unwinding the roll to use the glass ribbon in a continuous manufacturing process. Accordingly, there is a need for methods of, and apparatuses for, winding glass ribbon together with interleaf material so that the roll has straighter side walls.

Fourth, as again noticed by the inventors of the subject matter in the present disclosure, there is then a need to maintain the sidewalls in a straight manner during handling, shipping, and storage of the rolls.

SUMMARY

In order to form a roll of wound glass ribbon having straight side walls, the inventors have found that the effects of the differential cross-ribbon thickness and/or camber, among other things, can be counteracted by electrostatically pinning the interleaf material to the glass ribbon as they are wound together in a roll. For example, a positive charge may be applied to the interleaf material and a negative charge to the glass ribbon (or the other way around) as they are brought adjacent one another. This interleaf material/glass ribbon combination is then wound into a roll, wherein successive wraps of glass ribbon are separated from each other by a layer of the interleaf material. Because of the electrostatic attraction between successive layers of positively charged interleaf material and negatively charged glass, the stability of the wound roll for subsequent transport and handling is greatly enhanced. This is particularly true when the roll is wound at very low tension (e.g. less than 0.25 pounds per linear inch, as compared to typical web winding process parameters of 1-2 pounds per linear inch), which results in a low interlayer pressure (e.g. less than 7 pounds per square inch, as compared to typical web winding process parameters of 10 to 50 pounds per square inch), in an attempt to minimize the effects of camber in the glass ribbon. That is, low web tension during winding, and low pressure between the layers within the roll are factors that lead to slip of the layers relative to one another. However, the use of electrostatic pinning contributes to reducing or preventing the amount of slip that would otherwise produce a roll with non-straight side walls. Furthermore, the alternately positively and negatively charged layers result in a net neutral spool of glass and thus do not create any shock hazard.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiments, and together with the description serve to explain, by way of example, principles and operation of the invention. It is to be understood that various features of the invention disclosed in this specification and in the drawings can be used in any and all combinations. By way of non-limiting example the various features of the invention may be combined with one another as set forth in the following aspects.

According to a $1^{st}$ aspect, there is provided a roll of glass comprising:

a glass ribbon and an interleaf material rolled together so as to be disposed in alternating layers, wherein a layer of the interleaf material is pinned to an adjacent layer of the glass ribbon by an electrostatic force, wherein the electrostatic force is of a value so that a shear force required to cause slip between the interleaf material and the glass ribbon is greater than or equal to 10 times that required to cause slip between the interleaf material and the glass ribbon when not electrostatically pinned together.

According to a second aspect, there is provided the roll of glass according to aspect 1, wherein the electrostatic force is of a value so that when the interleaf material is pinned to the glass ribbon over a contact area of 176 square inches (1135 square cm) by the electrostatic force, a shear force required to cause slip between the interleaf material and the glass ribbon is greater than 100 oz. (2835 grams).

According to a third aspect, there is provided the roll of glass according to aspect 1 or aspect 2, wherein the glass ribbon has a thickness of <0.3 mm.

According to a fourth aspect, there is provided a method of rolling glass comprising:

conveying a glass ribbon relative to a first charging head so as to impart a first charge to the glass ribbon;

conveying an interleaf material relative to a second charging head so as to impart a second charge to the interleaf material;

juxtaposing the glass ribbon and the interleaf material so that the first and second charges are attracted to one another so as to pin the glass ribbon and the interleaf material in contact with one another; and rolling the pinned glass ribbon and interleaf material together into a roll including alternating layers of glass ribbon and interleaf material.

According to a fifth aspect, there is provided the method of aspect 4, wherein the first charging head and the second charging head are disposed adjacent one another across a gap, wherein a conveying path of the interleaf material and the glass ribbon extends through the gap, and wherein there are no rollers disposed within the gap.

According to a sixth aspect, there is provided the method of aspect 4 or aspect 5, wherein the first charging head does not contact the glass ribbon.

According to a seventh aspect, there is provided the method of any one of aspects 4 to 6, wherein the first electrode is spaced from the second electrode by a distance ranging from 1 to 4 inches (2.5 to 10 cm).

According to an eighth aspect, there is provided the method of aspect 7, further comprising guiding the interleaf material and the glass ribbon after they have been electrostatically pinned together so as to prevent the interleaf material and glass ribbon from contacting the first electrode or the second electrode as the roll increases in diameter.

According to a ninth aspect, there is provided the method of aspect 8, wherein the guiding comprises contacting the interleaf material with a roller.

According to a tenth aspect, there is provided the method of aspect 4, wherein the first charge is negative and the second charge is positive.

According to an eleventh aspect, there is provided the method of aspect 4 or aspect 10, wherein the first charge and the second charge are balanced so that the roll has a net neutral charge.

According to a twelfth aspect, there is provided the method of any one of aspects 4 to 11, wherein the difference between the first charge and the second charge is from 24 to 36 kV.

According to a thirteenth aspect, there is provided a method of unwinding a glass roll, having layers of glass ribbon and interleaf material electrostatically pinned together, comprising:

separating a first layer of glass ribbon and interleaf material from the roll;

peeling the interleaf material from the glass ribbon; and neutralizing the electrostatic charge on the glass ribbon.

According to a fourteenth aspect, there is provided the method of aspect 13, further comprising neutralizing the electrostatic charge on the interleaf material.

According to a fifteenth aspect, there is provided an electrostatic field applying apparatus comprising:

a frame;

a first charging head coupled to the frame and capable of applying a charge within a first range;

a second charging head coupled to the frame and capable of applying a charge within a second range, wherein the second charging head is disposed adjacent to the first charging head across a gap, wherein a conveying path for interleaf material and glass ribbon extends through the gap, and wherein there are no rollers disposed within the gap; and a roller coupled to the frame, and located adjacent to the conveying path as well as downstream of the gap and outside of the first and second ranges.

According to a sixteenth aspect, there is provided the apparatus of aspect 15, wherein the conveying path is disposed near the center of the gap.

According to a seventeenth aspect, there is provided the apparatus of aspect 15 or aspect 16, wherein the gap ranges from 1 to 4 inches (2.5 to 10 cm).

BRIEF DESCRIPTION OF THE DRAWINGS

FIG. 4 is a cross-sectional view of another embodiment of a roll of glass ribbon and interleaf material as taken along line 2-2 of FIG. 1.

FIG. 7 is a schematic illustration of camber in a glass ribbon.

DETAILED DESCRIPTION

Figure 1:
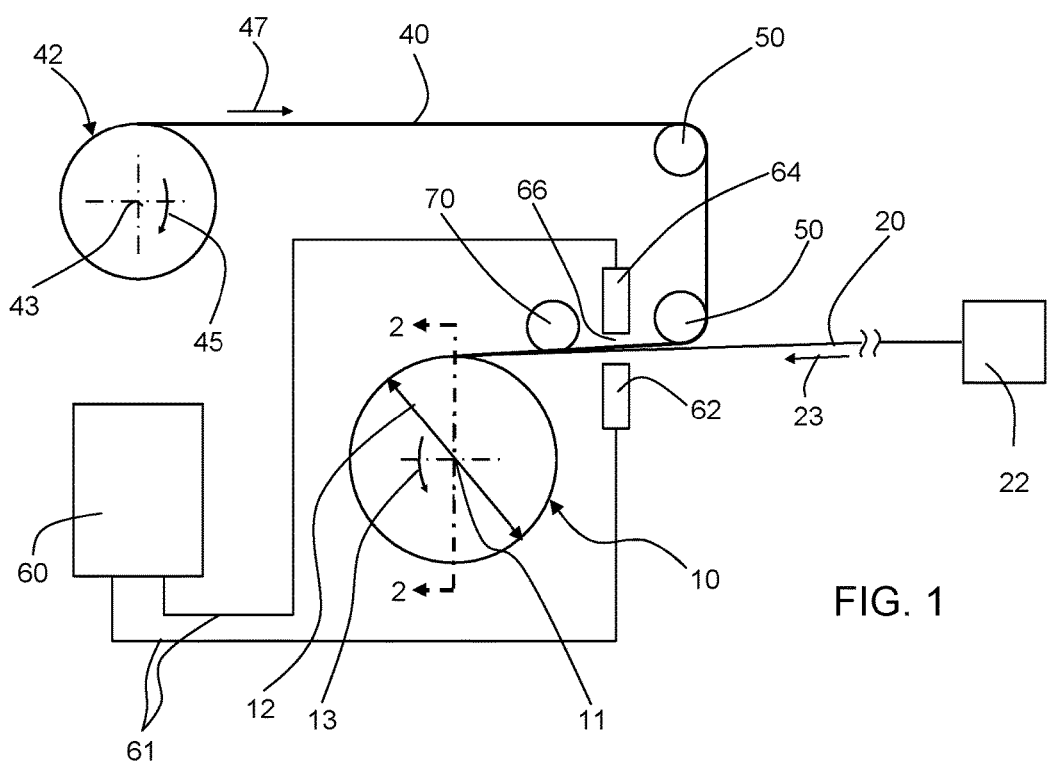
FIG. 1 is a schematic illustration of a thin glass ribbon being electrostatically pinned to and wound together with an interleaf material.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to a "component" includes aspects having two or more such components, unless the context clearly indicates otherwise.

One embodiment of an apparatus for electrostatically pinning glass ribbon together with interleaf material and winding them together into a roll will now be described in connection with FIGS. 1-3.

FIG. 1 is a schematic drawing of an apparatus for electrostatically pinning a glass ribbon 20 together with interleaf material 40 by applying charges thereto and winding them together into a roll 10. The apparatus includes rollers 50 for guiding the interleaf material 40, and a charge generator 60.

The glass ribbon 20 is supplied from an upstream process 22, for example, directly from a forming process, or any type of conveyance process in connection with using or manipulating the ribbon 20. The forming process may be, for example, a down draw, slot draw, fusion draw, up draw, or float, process. The conveyance process may be, for example, a process of conveying the glass ribbon during use (for example applying functional layers and/or devices on the surface of the glass ribbon or on previously placed functional layers or devices) or processing of the ribbon itself (for example: applying a coating to the ribbon surface; unwinding a ribbon having beads, removing the beads, and then rewinding the glass ribbon without the beads; and/or cutting the ribbon into one or more reduced-width portions which are then wound together in a roll). Further examples of processes in which the ribbon 20 may be conveyed include, for example, any step subsequent to the formation of the glass, including but not limited to grinding, polishing, cleaning, the deposition of additional layers and/or components (e.g. a polymer protective layer, electrical/electronic components or portions thereof) on the glass, the formation of thin film devices (e.g. transistors, electroluminescent layers, etc.) on the glass, cutting (including adjusting the width), splicing, rolling from another roll (either with or without interleaf material), etching processes either wet or plasma, or lamination to other films or structures. The upstream processes may be part of producing a glass ribbon 20, or part of processing the ribbon (including with roll-to-roll process methods).

Figure 2:
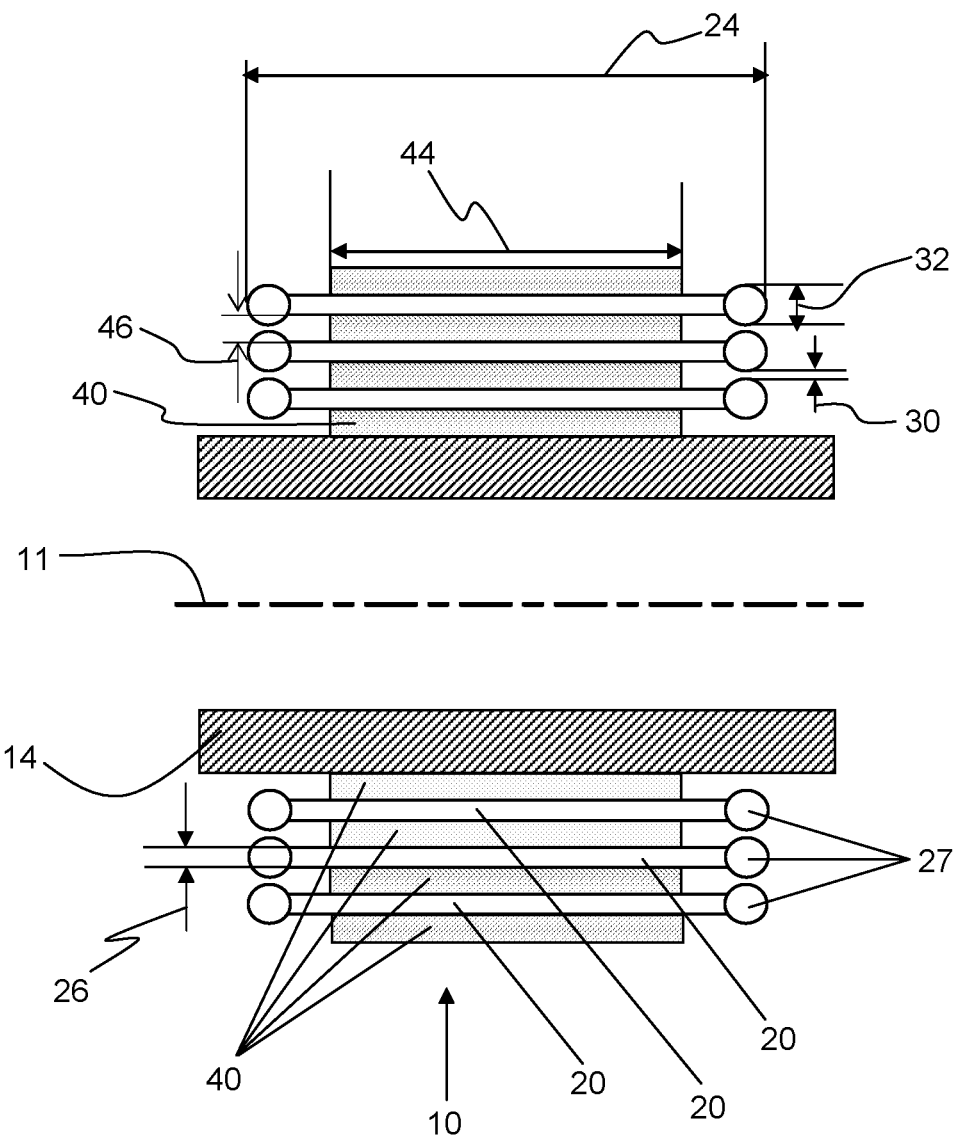
FIG. 2 is a cross-sectional view on one embodiment of a roll of glass ribbon and interleaf material as taken along line 2-2 of FIG. 1.

As shown in FIG. 2, which is a cross-sectional view of the roll 10 as taken along line 2-2 in FIG. 1, the glass ribbon 20 includes a width 24 and a thickness 26. The thickness 26 may be from 10 microns to 300 microns, for example, 10, 20, 30, 40, 50, 60, 80, 100, 110, 120, 130, 140, 150, 160, 180, 200, 210, 220, 230, 250, 260, 270, 280, 290, or 300, microns. Additionally, the ribbon 20 may include beads 27, which are thickened portions at the edges of the ribbon that arise from the ribbon forming process, for example when a down-draw fusion process is used to form the ribbon 20.

Referring back to FIG. 1, the interleaf material 40 is supplied in a roll 42 having a central longitudinal axis 43. The roll 42 rotates in the direction of arrow 45 as interleaf material 40 is pulled into roll 10. The interleaf material has a width 44 and a thickness 46, and may be formed from, for example, a polyethylene foam (either open or closed cell), a corrugated paper material, or a sheet of soft polyvinyl material having an embossed or textured surface. The interleaf material 40 is thickness compliant, i.e., it may be compressed to a certain extent.

As shown in FIGS. 1-2, the roll 10 may include a core 14, having a central longitudinal axis 11 about which the core 14 rotates in the direction of arrow 13. As seen in FIG. 2, the roll 10 includes glass ribbon 20 and interleaf material 40 wound in alternate layers. In the roll 10, the glass ribbon 20 is shown as being disposed in three layers, whereas the interleaf material 40 is shown as being disposed in four layers, however, there may be any suitable number of layers of each in the roll 10. The diameter 12 of the roll 10 grows as successive layers of glass ribbon 20 and interleaf material 40 are wound thereon.

In FIG. 2, the glass ribbon 20 is shown as including beads 27 having a thickness 32. The thickness 46 is chosen so that when the interleaf material 40 is subject to a pressure between the layers in the roll, the interleaf material 40 maintains a gap 30 between adjacent beads 27, thereby allowing the glass ribbon 20 to be wound into roll 10 without damage from the beads 27 contacting one another. As shown, the width 44 is less than the width 24, although such need not be the case.

The ribbon-forming process can produce variations in the thickness of the glass ribbon across its width, as well as "camber" in the motion of the ribbon. FIG. 7 illustrates a glass ribbon 20 which exhibits an amount of camber 5 (greatly exaggerated in this figure for purposes of illustration). As can be seen, camber 5 is a continuous curvature of the ribbon in one direction (i.e., to the left in FIG. 7). Such curvature can be caused by, for example, different rates of cooling of a ribbon's edge beads. Camber, thickness variation, and residual stresses in the glass ribbon can cause the ribbon to shift laterally, rather than conveying in a straight line. And upon attempting to wind the glass ribbon into a roll, this lateral shift causes the sides of the roll to be "dished", "telescoped", or otherwise not straight, i.e., straight side walls would generally include each of the edges 29 (see FIG. 4) being located substantially in one plane, for example.

In order to overcome the effects of camber and/or thickness variation during winding, when winding with low web tension and low pressure between layers of the roll, the glass ribbon is electrostatically pinned to the interleaf material, and successive wraps of glass ribbon/interleaf material are electrostatically pinned to one another.

Electrostatic charges may be applied to the glass ribbon 20 and interleaf material 40 by a charge generator 60, which is coupled to a first charging head 62 and a second charging head 64 via connections 61. The first charging head 62 is disposed adjacent to the glass ribbon 20 and may apply a negative charge thereto. The second charging head 64 is disposed adjacent to the inter leaf material 40 and may apply a positive charge thereto. For example, the charge generator 60 may be an MKS Ion Systems model 7306 dual polarity charging generator, whereas the charging heads 62, 64 may be model 7430 from the same company (recently acquired by Simco, having offices in Hatfield Pa. USA), which are non-contact charging heads. Of course, alternatively, a positive charge may be applied to the glass ribbon 20 whereas a negative charge may be applied to the interleaf material 40. The charge generator 60 may be set to apply a charge of 13.5 to 16 kV DC, for example, to one of the charging heads 62, 64, and a charge of negative 13.5 to negative 16 kV DC, for example, to the other of the charging heads 62, 64, whereby a charge differential of from 27 to 32 kV DC, for example, may exist between the charging heads 62, 64. The charging heads 62, 64 respectively add charge to the glass ribbon 20 and interleaf material 40; they do not merely polarize the charges existing in the glass ribbon 20 and interleaf material 40. The amount of charge to be added so as to pin the glass ribbon 20 with the interleaf material 40 will depend upon the thickness of the glass ribbon 20, and the characteristics of the interleaf material 40, for example, its thickness, and the type of material of which it is made. The charging heads 62, 64 extend across the full width of overlap between the glass ribbon 20 and interleaf material 40 (in this embodiment the amount of overlap is the full width 44), however, such need not be the case. Instead, the charging heads 62, 64 may extend across only a portion of the widths 24, 44, or may extend across various portions of the widths 24, 44 so as to apply the charges in separate continuous strips along the length of the ribbon 20 and interleaf material 40. Further, although the charging heads 62, 64 provide a region of continuous charge along the lengths of the glass ribbon 20 and interleaf material 40, again, such need not be the case. For example, the charging heads may be energized intermittently so that discrete areas of charge are applied along the length of the glass ribbon 20 and interleaf material 40 whereby intermittent sections thereof are pinned together.

The charges applied to the ribbon 20 and interleaf material 40 hold them together before they enter the roll 10, and hold successive wraps of ribbon 20/interleaf material 40 to one another within the roll 10. That is, a combination of glass ribbon 20/interleaf material 40 will not slide relative to another combination of glass ribbon 20/interleaf material 40 on top of which they have been wound. The roll 10 itself, however, is net neutral as the charges of adjacent wraps of glass ribbon 20/interleaf material 40 balance each other. Because successive wraps of glass ribbon 20/interleaf material 40 are held to one another by electrostatic charge, the roll 10 itself is very stable during transportation and storage. For example, with the above-described technique, glass ribbon lengths of greater than 800 feet (240 m) have been wound together with interleaf material into a roll with straight side walls, and then successfully (i.e., without loss of straightness in the side walls) transported in a horizontal orientation (i.e., longitudinal axis 11 of the roll 10 was disposed generally horizontally) by truck across distances of greater than 500 miles (300 kilometers); as well as unwound into subsequent roll-to-roll processes, for example, bead removal. Because of the electrostatic pinning between glass ribbon 20 and interleaf material 40 as well as between successive wraps of glass ribbon 20/interleaf material 40, the roll 10 may be wound with low tension on the webs (the glass ribbon 20 and/or interleaf material 40) during winding, and with low pressure between the glass ribbon 20 and interleaf material 40, as noted above. And yet, even with such low web tension and low pressure between the layers in the roll (which are used to make a glass roll with straight sidewalls), the layers in the roll do not slide with respect to one another. Accordingly, the side wall of the roll remains straight. Further, the interleaf material 40 is chosen so as to be a good dielectric (as is glass ribbon 20), whereby the electrostatic force pinning the glass ribbon 20 to the interleaf material 40 may be maintained for a long period of time, i.e., on the order of years. For example, a roll of Corning glass code 0211, 100 microns thick glass ribbon was rolled together with an interleaf material of irradiated cross linked Ethylene Vinyl Acetate (EVA copolymer foam having a thickness of 1/32 inch (0.8 mm), (available from FLEXcon of Spencer, Mass. as FLEXcon P.E.F. 32 white no PS), using the electrostatic pinning and winding conditions described herein, was placed in an unconditioned environment, in a horizontal orientation, and over a year and a half later there was no indication that the charge had dissipated; the roll maintained its straight sidewalls. Similar results are expected with other types and thicknesses of glass.

Figure 3:
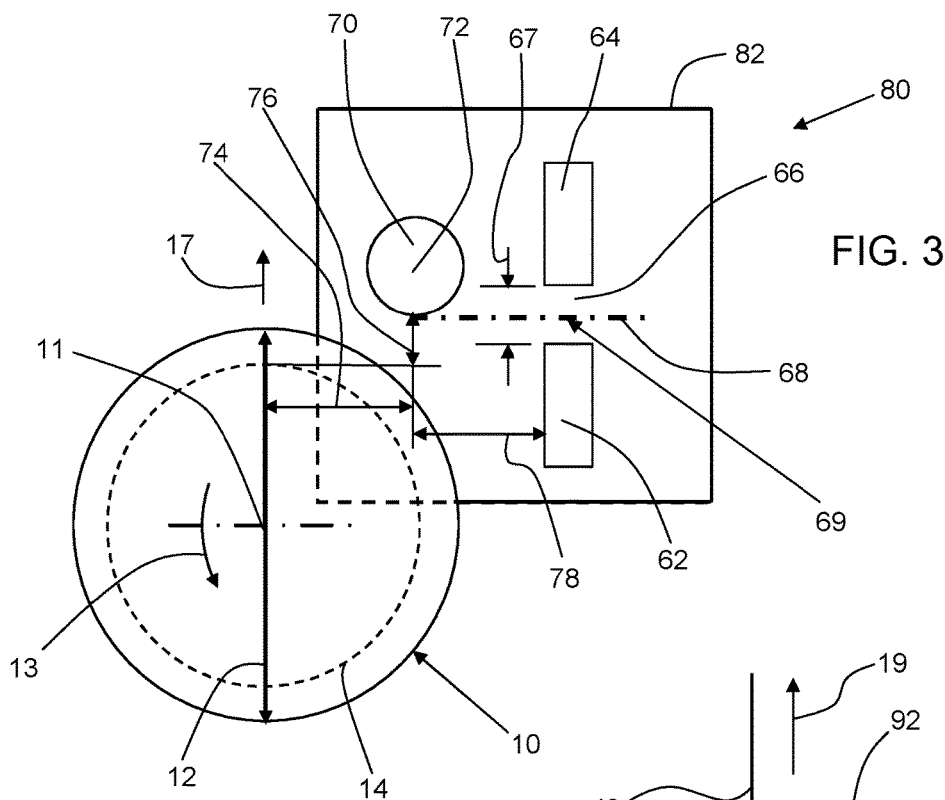
FIG. 3 is an enlarged schematic illustration of a portion of the apparatus of FIG. 1.

As shown in FIG. 3, the charging heads 62, 64 may be part of an electrostatic field applying device 80 that includes a frame 82 and a guide roller 70.

The charging heads 62, 64 are mounted on the frame 82 so that they are separated from one another by a gap 66 having a distance 67 and a center 69. The distance 67 may range from 1 to 4 inches (2.5 to 10.5 cm), for example. The distance 67 is chosen so that the glass ribbon 20 and interleaf material 40 pass through in close proximity to one another whereby they are pinned to one another shortly after they are charged by respective charging heads 62, 64. Accordingly, there is little chance for particles to be attracted to either the glass ribbon 20 or interleaf 40, whereby the glass 20 may be maintained in a clean state. Particles on the surface of glass ribbon 20 may lead to difficulty in further processing of the ribbon, damage to the structures applied to the glass ribbon 20, or damage to the surface of the ribbon 20 itself which may, in turn, lead to breakage of the glass ribbon 20. A conveying path 68 extends through the center 69 of the gap 67 and along a tangent to the outside diameter of the guide roller 70.

The guide roller 70 is mounted to the frame 82 and is located downstream of the charging heads 62, 64 by a distance 78. The distance 78 is chosen so that roller 70 is close to the charging heads, but not within the field of charge imparted by them. The glass ribbon 20 and interleaf material 40 enter the gap 67 on either side of the center 69, and by the time they reach the guide roller 70, they are pinned to one another and traveling along the conveying path 68. The guide roller 70 is also located so that its center 72 is disposed at a lateral distance 74 from the longitudinal axis 11 of the roll 10, and so that its outside diameter is located at a distance 76 from the outside diameter of the core 14. Distance 76 is also the distance from the conveyance path 68 to the outside diameter of the core 14. By appropriately choosing distance 76 (relative to distance 67) and the diameter of roller 70 (together with distance 74), the glass ribbon 20 and interleaf 40 may be continuously conveyed through the gap 67 without touching the charging heads 62, 64 from the time that they are first wrapped around core 14 and thereafter as the diameter 12 of the roll 10 grows in the direction 17 with each successive wrap of glass ribbon 20 and interleaf material 40 around the core 14. If the distance 76 is too much larger than the distance 67, the glass ribbon 20 will contact the charging head 62 on the initial wrap around core 14. As distance 74 becomes smaller, there is less room to accommodate the growing diameter 12 of roll 10, which then limits the amount of glass ribbon 20 that may be disposed in the roll 10. If the distance 74 is large enough, the diameter 12 may grow upward beyond the conveyance path 68, yet the glass ribbon 20/interleaf material 40 will be appropriately maintained relative to the conveyance path 68 (and out of contact with charging head 64) by the interleaf material 40 contacting the roller 70. As the diameter 12 grows, the glass ribbon 20/interleaf material 40 will bend further and further around roller 70. Accordingly, the diameter of roller 70 must be chosen large enough (in relation to the thickness 26 and Young's modulus of the glass ribbon 20) so as to avoid breakage in the glass ribbon 20.

FIG. 4 shows an alternative embodiment of the roll 10, which is due to alternative embodiments of each the glass ribbon 20 and the interleaf material 40. It is to be understood that the glass ribbon 20 shown in this figure (i.e., having no beads either because it was formed with no beads or because it had its beads previously removed) may be used with the interleaf material 40 (one strip) of FIG. 2, and the interleaf material 40 in this figure (i.e., separate strips 48 and 49 of interleaf material spaced from one another by a distance 41) may be used with the glass ribbon 20 (i.e., that having beads 27) of FIG. 2. The main differences from the configuration in FIG. 2 lie in the physical configuration of the glass ribbon 20 and interleaf material 40. Accordingly, for ease in description mainly the differences will be described with the understanding that the remaining properties, and like characteristics as denoted by like reference numerals, may remain the same.

As shown in FIG. 4, the interleaf material 40 is formed as a first strip 48 and a second strip 49 separated by a distance 41. Although only two strips 48, 49 are shown, any suitable number of strips may be used. The interleaf material 40 includes a thickness 46. The glass ribbon 20 includes edges 29 which may be as-formed edges or cut edges. In this embodiment, the charging heads 62, 64 would be appropriately configured so as to apply charge only within the area of overlap, across width 24, between the glass ribbon 20 and the strips 48, 49 of interleaf material 40.

Methods of forming a roll 10 of glass ribbon 20 and interleaf material 40, whereby the roll 10 has straight side walls that are maintained during handling, shipping, and storage of the roll, are also described. By applying suitable electrostatic charges, i.e., roughly equal and opposite, to the glass ribbon 20 and interleaf material 40 being wound, a suitable attraction between a layer of glass ribbon and interleaf material 40, as well as a suitable attraction between the successive wraps of glass ribbon/interleaf material in the roll 10 can be developed, whereby there are attained and maintained straight side walls in the roll 10.

The glass ribbon 20 is fed from an upstream process 22 along direction 23, past first charging head 62, and toward roll 10, which rotates in a direction 13. The charge generator 60 applies a voltage, for example negative 13.5 to negative 16 kV, to charging head 62 so as to add a negative charge to the glass ribbon 20. At about the same time that glass ribbon 20 is fed toward roll 10, an interleaf material 40 is unwound from roll 42 rotating in direction 45 and is fed along direction 47. The interleaf material 40 is positioned relative to the roll 10 and to the second charging head 64 by guide rollers 50. The charge generator 60 applies a voltage, for example, 13.5 to 16 kV, to second charging head 64 so as to add positive charge to the interleaf material 40. The glass ribbon 20 and interleaf material 40 are juxtaposed, whereby the positive and negative charges attract one another so as to electrostatically pin the glass ribbon 20 and interleaf material 40 together. The pinned glass ribbon 20 and interleaf material 40 are rolled together into roll 10, wherein successive wraps of glass ribbon 20/interleaf material 40 are also pinned to one another to keep the successive wraps from sliding relative to one another during transportation and storage of the roll 10. A tension of <0.25 pounds per linear inch (pli) (44 N/m) may be applied to the interleaf material 40 by any suitable manner, for example, by breaking roll 42. A tension of <0.25 pli (44 N/m) results in a pressure of <7 pounds per square inch (48 kPa) between adjacent layers of glass ribbon 20 and interleaf material 40. As the diameter 12 of the roll 10 grows in the direction 17, the roller 70 prevents the glass ribbon 20/interleaf material 40 from contacting the second charging head 64.

Figure 5:
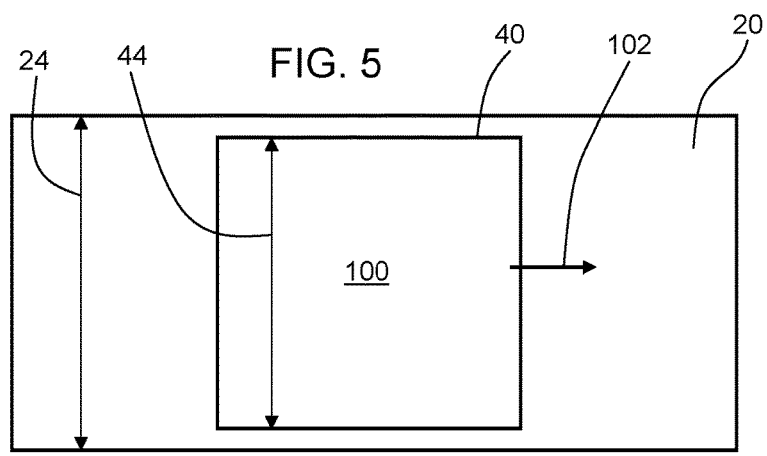
FIG. 5 is schematic illustration of a configuration for a shear force test.

To hold the successive layers of glass ribbon 20 and interleaf material 40 together during transportation and storage of the roll 10, the electrostatic force must be sufficiently strong. One measure of quantifying the electrostatic force is by the increase in shear force necessary to move the interleaf material 40 relative to the glass ribbon 20. That is, the shear force to move the interleaf material 40 relative to the glass ribbon 20 when electrostatically pinned together is compared with the shear force to move the interleaf material 40 relative to the glass ribbon 20 when not electrostatically pinned together. With reference to FIG. 5, the inventors performed a test wherein an interleaf material 40 having an area 100 of 176 square inches (1135 square cm) was placed on a glass ribbon 20. The interleaf material 40 was pulled in the direction of arrow 102. A pull-force gauge was connected to the interleaf material 40 at a point and used to measure the force required to cause the interleaf material 40 to start sliding relative to the glass ribbon 20. When no electrostatic pinning was present, a force of 10 oz. (283 grams) was required to make the interleaf material 40 start sliding on the glass ribbon 20. When the same interleaf material 40 (size and type of material) was electrostatically pinned to the same glass ribbon 20, in the manner described above-which the inventors found to suitably hold the interleaf material 40 relative to the glass ribbon 20 during transportation and storage of the roll 10—a force of 160 oz. (4536 grams) was required to make the interleaf material 40 start sliding relative to the glass ribbon 20. Because the same interleaf material 40 and same glass ribbon 20 were used in each case, there are eliminated any differences in shear force due to, for example, different coefficients of friction between the two materials. Accordingly, a shear force of greater than 10 times that of unpinned interleaf material and glass ribbon was required to start to move the interleaf material relative to the glass ribbon when they were electrostatically pinned together. Although the glass ribbon 20/interleaf material 40 configuration of FIG. 5 resembles that of FIG. 2, the test is equally applicable to the configuration shown in FIG. 4, as it is based on the area electrostatically pinned, wherein, here, that area is coextensive with the area of contact between the interleaf material 40 and the glass ribbon 20.

Figure 6:
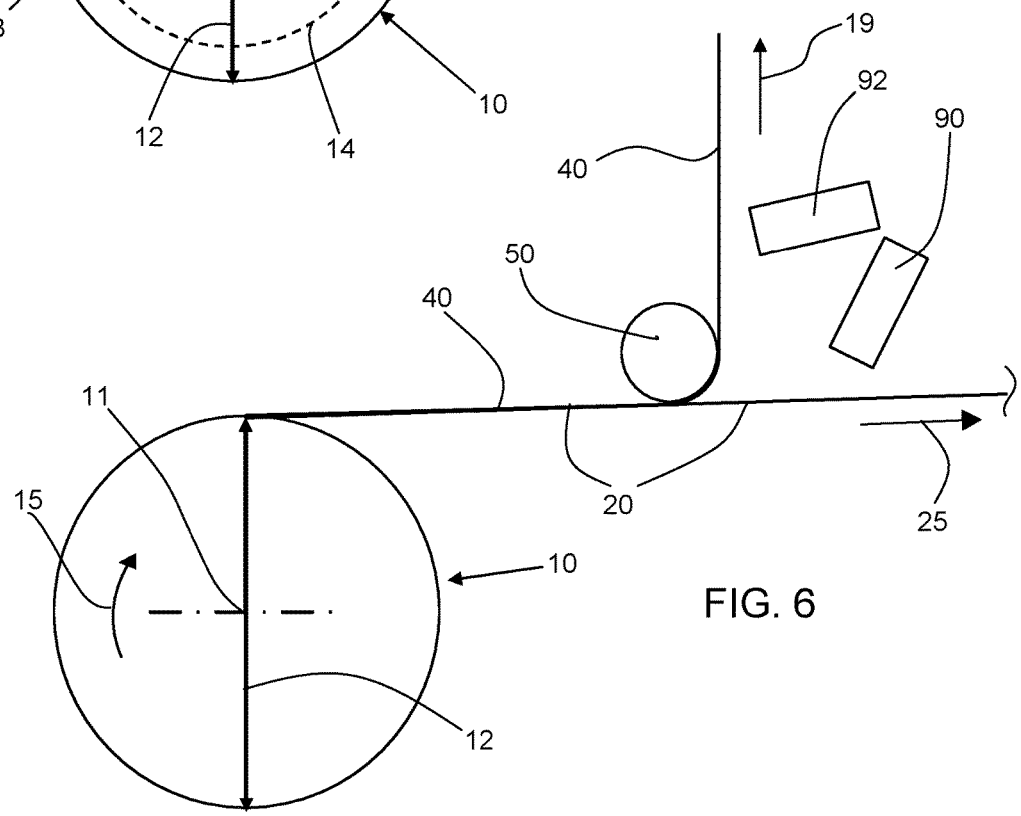
FIG. 6 is a schematic illustration of a thin glass ribbon being separated from an interleaf material.

Next, with reference to FIG. 6, there will be described a method of unwinding the roll 10. The roll 10 is rotated in the direction of arrow 15, and a layer of glass ribbon 20 pinned to interleaf material 40 is conveyed toward roller 50. The interleaf material 40 is rotated around roller 50 so as to travel in the direction of arrow 19, whereas the glass ribbon 20 is made to continue along in the direction of arrow 25. The glass ribbon 20 is thus separated from the interleaf material 40 near the location of roller 50 by applying a peeling force (as opposed to a shear force) between the glass ribbon 20 and interleaf material 40. However, after peeling the interleaf material 40 from the glass ribbon 20, these members still retain their respective charges as placed during the winding process. Thus, at this point, there are disposed first and second neutralizing heads 90, 92. The neutralizing heads 90, 92 may be, for example, MKS Ion Systems model 8001KDT neutralizing bars, which may be connected to a model 8100 power supply (not shown). The first neutralizing head 90 neutralizes the charge on the glass ribbon 20, whereas the second neutralizing head 92 neutralizes the charge on the interleaf material 40. By neutralizing the charges from the glass ribbon 20 at the point of peeling, there is reduced the chance that the glass ribbon will attract undesired particles.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, although the core is shown without flanges on its ends, flanges could be present. Further, the flanges could be permanently attached to the core, or could be removable.

Additionally, although four layers of interleaf material and three layers of glass ribbon are shown as being wound on a roll, any suitable number of layers of either may be present.

Further, although the charging heads 62, 64 are shown as non-contact charging heads, other types of charging heads may be used. For example, charging rollers or charging brushes (for example carbon fiber brushes) in contact with the glass ribbon 20 and interleaf material 40 could be used. Similarly, although neutralizing heads 90, 92 are shown as being of a non-contact variety, other types of neutralizing heads may be used, e.g. ones that contact the interleaf material or glass ribbon.

What is claimed is:

1. A method of rolling glass comprising:
   conveying a glass ribbon relative to a first charging head so as to impart a first charge to the glass ribbon;
   conveying an interleaf material relative to a second charging head so as to impart a second charge to the interleaf material;
   juxtaposing the glass ribbon and the interleaf material so that the first and second charges are attracted to one another so as to pin the glass ribbon and the interleaf material in contact with one another; and
   rolling the pinned glass ribbon and interleaf material together into a roll including alternating layers of glass ribbon and interleaf material.

2. The method of claim 1, wherein the first charging head and the second charging head are disposed adjacent one another across a gap, wherein a conveying path of the interleaf material and the glass ribbon extends through the gap, and wherein there are no rollers disposed within the gap.

3. The method of claim 1, wherein the first charging head does not contact the glass ribbon.

4. The method of claim 1, wherein the first electrode is spaced from the second electrode by a distance ranging from 1 to 4 inches (2.5 to 10 cm).

5. The method of claim 4, further comprising guiding the interleaf material and the glass ribbon after they have been electrostatically pinned together so as to prevent the interleaf material and glass ribbon from contacting the first electrode or the second electrode as the roll increases in diameter.

6. The method of claim 5, wherein the guiding comprises contacting the interleaf material with a roller.

7. The method of claim 1, wherein the first charge is negative and the second charge is positive.

8. The method of claim 1, wherein the first charge and the second charge are balanced so that the roll has a net neutral charge.

9. The method of claim 1, wherein the difference between the first charge and the second charge is from 24 to 36 kV.

10. A method of unwinding a glass roll, having layers of glass ribbon and interleaf material electrostatically pinned together, comprising:
    separating a first layer of glass ribbon and interleaf material from the roll;
    peeling the interleaf material from the glass ribbon; and
    neutralizing the electrostatic charge on the glass ribbon.

11. The method of claim 10, further comprising neutralizing the electrostatic charge on the interleaf material.

* * * * *